United States Patent

Lombana et al.

[15] 3,652,293

[45] Mar. 28, 1972

[54] INSTANT COFFEE COMPOSITIONS EXHIBITING A CRYSTALLINE SHEEN

[72] Inventors: Cesar A. Lombana; Rudolph M. Phillips, both of Springfield Township, Hamilton County; Richard Gregg, Greenhills, all of Ohio

[73] Assignee: The Procter & Gamble Company, Cincinnati, Ohio

[22] Filed: Jan. 9, 1969

[21] Appl. No.: 797,322

Related U.S. Application Data

[63] Continuation-in-part of Ser. No. 718,569, Apr. 3, 1968, abandoned.

[52] U.S. Cl. .............................................. 99/71, 99/DIG. 4
[51] Int. Cl. .............................................. A23f 1/08
[58] Field of Search .............................. 99/71, DIG. 4, 66

[56] References Cited

UNITED STATES PATENTS

| 1,271,761 | 7/1918 | Phillips, Jr. et al. | 99/66 |
| 1,903,362 | 4/1933 | McKinnis | 99/65 |
| 2,929,717 | 3/1960 | Eskew | 99/71 |
| 2,976,158 | 3/1961 | Morgan, Jr. et al. | 99/71 X |
| 2,977,203 | 3/1961 | Sienkiewicz et al. | 99/71 UX |
| 3,493,388 | 2/1970 | Hair | 99/71 |

Primary Examiner—Frank W. Lutter
Assistant Examiner—William L. Mentlik
Attorney—Richard C. Witte

[57] ABSTRACT

Novel instant coffee compositions characterized by an appearance that presents at least one external planar surface exhibiting high sheen, and novel processes for obtaining these instant coffee compositions comprising polishing, and preferably structuring, thin dense instant coffee flakes by exposing the instant coffee flakes to a jet of moistening fluid comprised of steam or finely atomized water.

8 Claims, 4 Drawing Figures

PATENTED MAR 28 1972

3,652,293

INVENTORS
Cesar A. Lombana
Rudolph M. Phillips
Richard Gregg

BY Stephen R. Smith
John B. Goodman
ATTORNEYS

INSTANT COFFEE COMPOSITIONS EXHIBITING A CRYSTALLINE SHEEN

This application is a continuation-in-part of applicants' copending application, Ser. No. 718,569, filed Apr. 3, 1968, now abandoned, entitled "Instant Coffee Compositions Exhibiting A Crystalline Sheen."

BACKGROUND OF THE INVENTION

The field of this invention relates to soluble or instant coffee.

For many years producers of instant coffee have sought to improve the acceptance of this type of coffee product vis-a-vis roast and ground coffee. Much effort, for example, has gone into improving the flavor quality of instant coffee. While absolute equality of the flavor of instant coffee as compared to roast and ground coffee is yet to be attained, very substantial improvements in the flavor of instant coffee have been made, and a significant increase in consumer acceptance of instant coffee has occurred in the last 10–15 years. Flavor improvement has been a particularly important factor in this increased consumer acceptance of instant coffee. It has become increasingly apparent, however, that other characteristics of instant coffee such as aroma, density, dustiness, foaming properties, and appearance can also greatly affect the acceptability of instant coffee. In particular, it has become more and more clear that appearance especially affects consumer acceptance of an instant coffee product, and recently much effort has been devoted to improving the appearance of instant coffee.

Instant coffee products which have been on the market for the past 10–15 years have generally been in the form of a light brown powder. The appearance of such instant coffee products is not very attractive. Of late, instant coffee producers have been engaged in manipulating instant coffee powders to produce more attractive instant coffee products. For example, U.S. Pat. No. 2,977,203 discloses that instant coffee powder can be darkened and agglomerated with a jet of steam to provide a product with a "robust" appearance when the instant coffee powder and the jet of steam are arranged in a highly specific planar relationship. Other efforts have been directed to giving instant coffee the appearance of roast and ground coffee. See, for example, U.S. Pat. application Ser. No. 598,004 of Hair, now U.S. Pat. No. 3,493,388 and U.S. Pat. application Ser. No. 598,085 of Hair and Strang, now U.S. Pat. No. 3,493,389 both filed Nov. 30, 1966, and commonly assigned.

Still other efforts relating to improving the appearance of instant coffee have been directed to giving instant coffee a unique appearance. In particular, commonly assigned U.S. Pat. application Ser. No. 638,858 of Andre, Joffe, and Strang, filed May 16, 1967, now abandoned concerns attractive instant coffee products which present an especially unique appearance. The appearance of these instant coffee compositions is especially unique in that the compositions are comprised, in whole or in part, of thin flakes of instant coffee having a thickness within the range of from about 0.002 inch to about 0.01 inch. These particular instant coffee compositions not only present a unique appearance, but also have other very desirable characteristics relating to aroma, density, dustiness, and foaming properties. While these instant coffee compositions present a unique appearance, The flakes are flat and generally nonuniform in shape, and thus each flake reflects light differently from a different plane in much the same manner as do particles of roast and ground coffee. Instant coffee compositions comprising a combination of these flakes and conventional instant coffee can have a very close resemblance to roast and ground coffee because of the variety of particle shapes and sizes present in such a combination.

While these, and other, prior efforts have done much to improve the appearance of instant coffee compositions, a particularly unique form of instant coffee presenting an especially distinctive and attractive appearance would be desirable.

SUMMARY OF THE INVENTION

This invention relates to novel instant coffee compositions having an especially unique and attractive appearance, and novel processes for obtaining these instant coffee compositions.

The novel instant coffee compositions of this invention are instant coffee particles characterized by an appearance that presents at least one external planar face exhibiting high sheen, as for example, a highly polished instant coffee flake having a thickness within the range of from about 0.002 inch to about 0.01 inch. In another, and preferred, embodiment of this invention instant coffee flakes are agglomerated, either with other instant coffee flakes or densified coffee powder, into novel structured instant coffee particles which are nonplanar, but which present a plurality of external planar faces exhibiting high sheen. These novel instant coffee compositions do not have the appearance of roast and ground coffee to the extent that these compositions present to the observer planar surfaces polished to a high sheen. The planar surfaces of these instant coffee compositions which are polished to a high sheen have a high reflectivity causing these novel instant coffee forms to glisten and sparkle when exposed to light.

The novel process for obtaining instant coffee compositions which present an external planar face exhibiting high sheen comprises polishing thin dense instant coffee flakes by exposing the instant coffee flakes to a jet of moistening fluid comprised of steam or finely atomized water.

BRIEF DESCRIPTION OF THE DRAWING

The Drawing presents in

Figure 1:
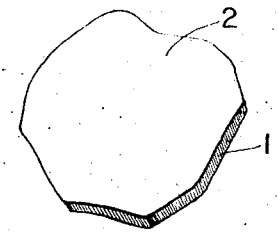
FIG. 1 an illustration of an instant coffee flake having an external planar face (2) polished to a high sheen.

The Drawing will be discussed in more detail hereinafter.

DISCUSSION OF THE INVENTION AND ITS PREFERRED EMBODIMENTS

This invention relates to novel instant coffee compositions having an especially unique and attractive appearance, and novel processes for obtaining these instant coffee compositions. In its broadest aspect the invention provides (1) a process for polishing the planar surfaces of thin dense instant coffee flakes to a high sheen and (2) novel instant coffee particles obtained by this process which present at least one polished external planar face exhibiting high sheen.

It has been surprisingly found that the surfaces of thin dense instant coffee flakes can be polished to a high sheen by exposing the instant coffee flakes to a jet of moistening fluid, and that these instant coffee flakes can be agglomerated into structured instant coffee particles which are nonplanar, but which present a plurality of external planar faces exhibiting high sheen.

The instant coffee flakes contemplated for use in this invention are thin flakes having a thickness within the range of from about 0.002 inch to about 0.01 inch and a density[1] ([1]In this specification and in the appended claims, the term "density", used alone, refers to the absolute density of individual particles. The term "bulk density" refers to the overall density of a plurality of particles measured after vibratory settlement in a manner such as that described on pages 130, 131 of "Coffee Processing Technology", Avi Publishing Co., Westport, Conn., 1963, Vol. 2.) within the range of from about 0.8 to about 1.7 grams per cubic centimeter (hereinafter abbreviated as "gm./cc."). Instant coffee flakes are not to be confused with the light fluffy, porous particles of instant coffee obtained by drum or freeze drying which have also, on occasion, been referred to as "flakes."

Instant coffee flakes can be prepared from conventional instant coffee, such as spray-dried instant coffee powder or particles, or freeze-dried instant coffee particles. Other instant coffee particles or powders can also be used as the starting material, for example, drum-dried, foam-mat dried, and vacuum-dried instant coffees or combinations thereof.

Conventional instant coffee particles used as the starting material for preparing instant coffee flakes can be prepared by any convenient process. These conventional instant coffee particles can be prepared domestically or imported. For example, suitable instant coffee particles are readily imported from Brazil and are designated "Brazilian Powders." Mixtures of domestically produced and imported instant coffee particles are also suitable for use herein as the starting material for preparing instant coffee flakes.

Conventionally, instant coffee is prepared by roasting and grinding a blend of coffee beans, extracting the roast and ground coffee with water to form an aqueous coffee extract, and drying the extract to form instant coffee particles. Various techniques, the most important of which are discussed below, allow the removal and preservation of the more fugitive coffee flavor materials, and their subsequent readdition to instant coffee in a manner wherein they are not destroyed.

Typical roasting equipment and methods for roasting coffee beans are described, for example, in Sivetz & Foote, "Coffee Processing Technology," Avi Publishing Company, Westport, Connecticut, 1963, Vol. 1, pp. 203-226. Coffee oil is often expelled from a portion of the roasted beans prior to grinding as disclosed hereinafter. The coffee beans which have not been oil-expelled are ground, preferably to a United States Standard screen size of from about 8 mesh to about 20 mesh. Typical grinding equipment is described, for example, in Sivetz & Foote, supra, pp. 239-250.

An aqueous coffee extract is obtained by extracting the roast and ground coffee with water. While numerous types of continuous or batch extraction systems can be used, the most commonly used system for the extraction of roast and ground coffee is a multi-column extraction train. This system is composed of a number of elongated extraction columns connected in series for continuous counter-current operation. While in these columns, and prior to extraction, the roast and ground coffee can be steam distilled to remove a volatile flavor fraction, and the flavor fraction can be condensed. The distillation often is accomplished by passing steam through the coffee column for from about 10 to about 45 minutes. The condensate can be added immediately to a previously obtained extract; if not, it should be chilled to about 20° F. or less and maintained at that temperature until such time as it is added to an extract.

Once the distillation operation is completed, the coffee is extracted by admitting hot water, such as from about 320° F. to about 375° F., to the last column of the extraction train. The temperature decreases as the water passes through the system, and is withdrawn from the column containing the freshest (previously unextracted) roast and ground coffee at a temperature of from about 190° F. to about 230° F. Typical disclosures of equipment and methods which can be used in the above operations are as follows: steam distillation — Sivetz, "Coffee Processing Technology", Avi Publishing Company, Westport, Conn., 1963, Vol. 2, pp. 43-46, and U.S. Pat. No. 2,562,206 to Nutting, issued July 31, 1951; extraction — Sivetz & Foote, supra, pp. 261-378, and U.S. Pat. No. 2,515,730 to Ornfelt, issued July 18, 1950.

Once a coffee extract has been obtained, it is preferable for the extract to be concentrated to at least about 45 percent by weight coffee solubles. This concentration step is particularly beneficial for extracts which contain a previously obtained distillate. The high concentration of coffee solubles helps to preserve the fugitive coffee flavor materials from deterioration. Concentration can be by any conventional method, such as freeze concentration, thin film evaporation and flashing, or by the addition of previously dried coffee powder. The extract is then dried to obtain instant coffee particles. While any convenient drying method can be used, the most common drying method is spray-drying. Spray-drying procedures, particularly as related to instant coffee products, are well known in the art and need not be described in detail herein. Typical disclosures on spray-drying processes and equipment are found in Sivetz & Foote, supra, Vol. I, Chapters 11 and 12.

Alternatively, the coffee extract can be freeze-dried. Freeze-dried instant coffee is prepared by freezing a coffee extract prepared as described above. The frozen extract, granulated if desired, then is placed in a chamber under vacuum (preferably less than 500 microns of mercury absolute pressure) and maintained at low temperatures (preferably less than −15° F.). Heat then is applied to remove water from the frozen extract by sublimation. Processes of this type are often capable of achieving excellent flavor retention during drying.

The type of freeze-drying equipment which is used in preparing the freeze-dried coffee particles described above is well known to those skilled in the art. Many manufacturers produce commercial and laboratory-size freeze dryers which are useful in preparing freeze-dried coffee. Freeze-dried coffee for use herein can be prepared by any known freeze-drying process. Typical disclosures relating to processes and equipment for freeze-drying can be found, for example, in Copley and Van Arsdel, "Food Dehydration," Avi Publishing Company, Westport, Connecticut, 1964, Vol. II, pp. 105-131; Perry, "Chemical Engineers' Handbook," McGraw-Hill Book Co., New York, 4th Ed., 1963, pp. 17-26 to 17-28; Tressler and Evers, "The Freezing Preservation of Foods," Avi Publishing Company, Westport, Connecticut, Vol. 1, pp. 612-626, and in U.S. Pat. No. 2,751,687 to Colton, issued June 26, 1956.

Irrespective of how the instant coffee particles are obtained, instant coffee flakes useful in this invention can be obtained by roll milling instant coffee particles, and/or a blended mixture of instant coffee particles and coffee oil. Instant coffee particles can be fed into the nip between two rolls of a roll mill which are rotating so that the coffee material is pulled into the nip and compressed into flakes which can then be removed from the roll. Preferably from about 0.01 to about 0.7 percent, most preferably from about 0.1 percent to about 0.3 percent coffee oil is blended with the instant coffee particles to facilitate milling. Greater amounts of coffee oil, for example, 1 percent or more can be used.

Instant coffee flakes useful in this invention can be made from instant coffee particles with no added coffee oil but the milling operation is facilitated and the yield of usable flakes is higher if a blend of instant coffee particles and coffee oil is used. Therefore, while it is not essential, preferably, the instant coffee particles are blended with coffee oil before milling; preferably, the coffee oil is an aromatizing coffee oil.

Aromatizing coffee oils can include those prepared from a variety of sources, both natural or artificial, or mixtures thereof. In either case, the coils preferably contain at least a substantial proportion of those components which are responsible for the aroma and odor of the coffee. A preferred aromatizing oil is raw expelled coffee oil containing an aroma concentrate. Under preferred conditions, such an aromatizing oil is prepared, e.g., by expelling whole roast coffee beans in an inert atmosphere of carbon dioxide or nitrogen. Preferably the oil obtained is maintained and stored under mild to low temperature conditions. (Typical oil-expelling equipment is described, for example, in Sivetz & Foote, "Coffee Processing Technology," Avi Publishing Company, Westport, Conn., 1963, Vol. 2, pp. 27-30.) Preferably a homogeneous blend of instant coffee particles and coffee oil is formed for roll milling into instant coffee flakes. Such a blend can be formed by adding coffee oil to instant coffee particles, preferably by spraying the desired amount of oil onto the particles under an inert atmosphere, and blending the resulting mixture. The blending can be accomplished in any suitable type of standard power mixer such as an inclined rotating drum or ribbon blender or a paddle mixer.

The moisture content of instant coffee particles to be roll milled is not highly critical, but it is preferably below about 5 percent. Moisture levels appreciably higher than 5 percent tend to cause undesired fusion of the instant coffee flakes obtained.

Important factors in the roll milling of instant coffee particles to obtain instant coffee flakes include: (A) roll diameter, (B) roll surface finish, (C) roll speeds and relative speeds, (D) nip pressure, (E) amount of coffee oil in the blend of instant coffee particles and coffee oil to be milled, (F) temperature, and (G) bulk density of the instant coffee particles.

Thin dense instant coffee flakes useful in this invention can be made with one pass through a two-roll mill having roll diameters within a wide range, e.g., as small as about 2 inches or smaller and as large as about 80 inches or larger, preferably from about 3 inches to about 30 inches, and operating at peripheral speeds from about 1 foot per minute up to about 500 feet per minute, preferably from about 10 feet per minute up to about 400 feet per minute. The optimum yield of desirable flakes is generally obtained when both rolls operate at the same speed. If the oil level in the blend is above about 1 percent, the oil effectively acts as a lubricant thus reducing the shearing action in the flakes caused by a difference in roll speed between the two rolls, and in this event, different roll speeds can be utilized. Speed ratios in excess of 1.5:1 are not desirable irrespective of the amount of oil. Preferably, the roll speed ratio is within the range of from about 1:1 to about 1.4:1.

Highly polished roll surfaces are beneficial, especially for roll diameters above about 6 inches and when using blends of instant coffee particles and coffee oil containing less than about 0.7 percent oil. The polished surfaces reduce friction between the instant coffee particles and the rolls, thus preventing the rolls from dragging excess material into the nip which can result in instant coffee flakes that are undesirably thick and/or dense or which can cause operational difficulties with the roll mill.

Nip pressures can vary from about 25 pounds per inch to about 3,000 pounds per inch. The lower pressures are satisfactory for most applications, and the upper part of the range generally is required if no or little coffee oil is added to the instant coffee particles or if the instant coffee particles to be roll milled are very dense.

The temperature of the mill rolls can be varied over a wide range, e.g., from about 60° F. to about 200° F. The temperature of the mill rolls, however, does affect the color of the flakes. If lighter color flakes are desired the mill roll temperature should be maintained within the range of from about 60° F. to about 140° F. If darker color flakes are desired, the mill roll temperature should be maintained within the range of from about 140° F. to about 200° F. Preferably, however, the mill roll temperature is not maintained above about 200° F, as higher temperatures can damage coffee flavor and/or cause excessive softening of the powder during milling.

Instant coffee flakes useful in this invention having a thickness within the range of 0.002 inch to about 0.01 inch and a density within the range of from about 0.8 g./cc. to about 1.7 g./cc. can be prepared in the manner indicated above. The thickness and density of the instant coffee flakes obtained depend primarily on the nip pressure of the rolls, and density of the instant coffee particles fed to the mill. Denser particles give thicker flakes. Suitable bulk densities for the instant coffee particles to be roll milled are from about 12 to about 25 pounds per cubic foot.

Especially preferred conditions for obtaining very desirable instant coffee flakes useful in this invention are as follows:

Instant Coffee To Be Milled
A blend of (a) instant coffee particles having a bulk density of 17 to 21 pounds per cubic foot and a moisture content of 3 to 4 percent, and (b) from about 0.1% to about 0.7% coffee oil.

Roll Mill Conditions
Roll surface — moderately to highly polished
Roll diameter — 12–24 inches
Roll speeds — 150–200 feet per minute
Nip pressure — 800–1600 pounds per inch
Roll temperature — 150–180° F.

For the purposes of this invention, the instant coffee flakes obtained by roll milling instant coffee particles are preferably size reduced such that all the flakes pass a U.S. Standard Screen No. 6, and most preferably a U.S. Standard Screen No. 12. Preferably, while smaller particle sizes can be used, the instant coffee flakes are not reduced in size to such an extent that the flakes will not be retained on a U.S. Standard Screen No. 30. Suitable apparatus for size reducing instant coffee flakes can include a set of vibrating screens with a plurality of small, hard balls or beads thereon. Other standard grinding, slicing or breaking devices such as a hammer mill, Fitz mill slitter, or Entoleter can also be used for size reduction.

As mentioned hereinbefore the instant coffee flakes contemplated for use in this invention are thin flakes having a thickness within the range of from about 0.002 inch to about 0.01 inch and a density within the range of from about 0.8 g./cc. to about 1.7 g./cc. Instant coffee flakes, such as for example those obtained in the manner indicated above, have planar surfaces which often can appear to be smooth, but the surfaces of the flakes do not exhibit a high sheen.

It has been surprisingly found that the planar surfaces of instant coffee flakes can be polished to a high sheen by exposing the instant coffee flakes to a jet of moistening fluid. The jet of moistening fluid can be a jet of finely atomized water, or steam. At the point where the jet is introduced to the instant coffee flakes, the velocity of the jet should preferably be from about 100 feet per minute to about 10,000 feet per minute, most preferably from about 200 feet per minute to about 2,000 feet per minute. Preferably, the moistening fluid is steam, and preferably the steam is at a temperature of about 212° F.

The instant coffee flakes can be exposed to the jet of moistening fluid in a variety of ways. Preferably, the instant coffee flakes are exposed to the jet of moistening fluid by introducing to a stream of instant coffee flakes a jet of moistening fluid at an angle of 90° with respect to the direction of travel of the stream of instant coffee flakes. The action of the jet of moistening fluid on the instant coffee flakes polishes one or both planar surfaces of the instant coffee flakes such that instant coffee flakes having at least one external planar surface polished to a high sheen are obtained.

The polished instant coffee flakes obtained should be dried to a moisture content of from about 3 percent to about 4 percent to prevent the flakes from fusing or melting together into an amorphous mass. Drying can be accomplished in a variety of ways, as for example by collecting the flakes on a moving bed such as a vibrating conveyor and exposing the moving bed of flakes to heat lamps or warm air. During drying the temperature of the flakes should not exceed 175° F. as higher temperatures can be detrimental to flavor.

While some instant coffee flakes are agglomerated in the above process, the thickness and density of the instant coffee flakes polished in the above process which are not agglomerated does not change appreciably. (Less agglomeration occurs when the velocity of the jet of moistening fluid is low, as for example 500 feet per minute, and the stream of flakes is thin, as for example when the stream has a thickness of about one thirty-second inch.) The polished instant coffee flakes obtained are comprised of novel instant coffee flakes having (1) a thickness of from about 0.002 inch to about 0.01 inch, (2) a density of from about 0.8 g./cc. to about 1.7 g./cc. and (3) at least one external planar face exhibiting a high sheen. Since these instant coffee forms have planar surfaces polished to a high sheen, the polished surfaces of these instant coffee forms have a high reflectivity, causing these novel instant coffee forms to glisten and sparkle when exposed to light. These novel instant coffee compositions are especially unique and attractive in that they present an appearance distinctly resembling the appearance of crystals which glisten and sparkle when exposed to light. These compositions are useful per se; or they can be used in admixture with conventional instant coffee particles for example in weight ratios of novel composition to conventional instant coffee particles ranging from about 20:1 to about 1:20.

In another, and preferred, aspect of this invention instant coffee flakes are agglomerated during the above-described polishing process, with other instant coffee flakes and/or densified domestic or imported coffee powder, into novel structured instant coffee particles which are non-planar, but which present a plurality of external planar faces exhibiting high sheen. Each of these novel particles can also be described as being comprised of a plurality of instant coffee flakes fused together into a particle which is a three-dimensional structured array of instant coffee flakes.

One problem with instant coffee products comprised of planar flakes of instant coffee is that the flakes because of their form tend to nest together. Unlike planar instant coffee flakes, the novel structured three-dimensional instant coffee particles of this invention desirably do not tend to nest together. In addition, the structured instant coffee particles are especially desirable in that they can present external planar surfaces polished to a high sheen disposed in many different planes. Since the structured instant coffee particles do not tend to nest together as do instant coffee flakes, instant coffee products comprised of the structured instant coffee particles can have heightened glisten and sparkle. This is so because more of the polished surfaces present are exposed, thus enhancing the attractive crystalline appearance of the product. The appearance of instant coffee products comprised of the structured instant coffee particles of this invention is additionally enhanced because the exposed polished planar surfaces of the structured instant coffee particles are disposed in many different planes. This highly enhances the appearance of an instant coffee product comprised of these particles because as the line of sight of an observer with respect to product changes, numerous highly polished reflecting surfaces can continually momentarily enter and leave the line of sight of the observer. The highly polished planar surfaces momentarily entering the line of sight of the observer present to the observer intermittent flashes of reflected light. As a result of these intermittent flashes of light from the structured instant coffee particles, an instant coffee product comprised of these particles appears to twinkle and sparkle when exposed to light, presenting an especially unique and attractive appearance.

It has been surprisingly found that structured instant coffee particles can be obtained by a novel agglomerating and polishing process comprising 1. forming a stream of instant coffee flakes, said stream having a thickness greater than about one-sixteenth inch;
2. introducing to said stream of flakes, at a point where the thickness of the stream of flakes is greater than about one-sixteenth inch, a jet of moistening fluid, said jet being introduced at an angle of from about 45° to an angle of about 135° with respect to the direction of travel of said stream, and
3. collecting the resulting structured instant coffee particles which are non-planar, but which present a plurality of external planar faces exhibiting high sheen.

It is critical that the instant coffee flakes hereinbefore described as contemplated for use in this invention be used in this agglomerating process. As mentioned hereinbefore, such flakes have a thickness of from about 0.002 inch to about 0.01 inch. In this process it is preferred that the flakes have a thickness of from about 0.003 inch to about 0.007 inch, and most preferably from about 0.003 inch to about 0.005 inch. It is also preferred that the instant coffee flakes be of such a size that they are retained on a U.S. Standard Screen No. 30, and pass a U.S. Standard Screen No. 6. Preferably the flakes pass a U.S. Standard No. 10, and most preferably a U.S. Standard Screen No. 12.

The stream of instant coffee flakes can have a thickness of from about one-sixteenth inch to about 2 inches, and greater. At the point where the jet of moistening fluid is introduced to the stream of instant coffee flakes, the stream of coffee flakes preferably has a thickness of from about one-fourth inch to about 1 inch, and most preferably a thickness of from about one-fourth inch to about three-fourths inch. The most preferred results are obtained when the stream of instant coffee flakes has a circular or ellipsodial cross-sectional shape (rod shaped when viewed from the side). In order to get good agglomeration, the stream of instant coffee should be comprised of a substantial number of coffee flakes.

Suitable moistening fluids are finely atomized water and steam. Steam is the preferred moistening fluid, and most preferably the steam is at a temperature of about 212° F. The jet of moistening fluid is introduced to the stream of instant coffee flakes at an angle of from about 45° to about 135° with respect to the direction of travel of the stream of flakes. Preferably the jet of moistening fluid is introduced at an angle of from about 60° to about 120°, most preferably at about 90°, with respect to the direction of travel of the stream of flakes. Also preferably, the stream of coffee flakes is freely falling downward by the force of gravity. Thus, in a preferred aspect of the agglomeration, a jet of steam hits a rod of freely falling instant coffee flakes at an angle of about 90° rather than, for example, a rectangular shaped falling curtain of particles (planar when viewed from the side). The jet of moistening fluid preferably has the same shape as the falling flakes, i.e., preferably it has the configuration of a rod. The velocity of the jet of moistening fluid should be sufficient to redirect the direction of travel of the stream of flakes, and provide sufficient contact among the flakes to form agglomerates. Preferably the velocity of the jet is from about 2,000 feet per minute to about 10,000 feet per minute, most preferably from about 3,000 feet per minute to about 8,000 feet per minute, at the point where the jet is introduced to the stream of flakes.

The structured particles produced by the action of the jet on the stream of flakes can be collected in any suitable manner. Initially, the particles are preferably collected on a smooth inclined plane of material, for example an inclined plane of sheet metal at an angle of 30° to the horizontal. The particles can move down the inclined plane under the force of gravity, and can be transferred to any suitable moving conveyor, for example a moving belt or vibrating conveyor. It is preferable to initially collect the particles in the manner indicated above because this method of collecting the particles is gentle. The particles should be dried to a moisture content of from about 3 percent to about 4 percent by weight, for example, about 3.8 percent by weight. The particles are most conveniently dried while on the conveyor. Drying can be accomplished with heat lamps or warm air. During drying, the product temperature preferably should not rise above about 175° F., as higher temperatures can be detrimental to the flavor of the instant coffee particles.

It is well known in the art that random-shaped particles such as crystals and, for example, flake-like products are difficult to agglomerate, and that in many cases the agglomerates formed from such particles are likely to be fragile. In particular, instant coffee powder comprised of random-shaped instant coffee particles has been included in this category. The difficulty is probably due to the lesser exposed surface area and the probability of insufficient interfacial contact. (See, World Coffee & Tea, November, 1967, Vol. 8, No. 7, page 41.)

In another, and preferred aspect of this invention, a mixture of instant coffee flakes and densified instant coffee powder comprised of from about 5 percent to about 80 percent instant coffee flakes and from about 20 percent to about 95 percent densified instant coffee powder is agglomerated according to the above process.

It has been surprisingly found that this preferred novel agglomerating process gives especially preferred structured instant coffee particles, characterized by improved strength, which are non-planar, but which present a plurality of external planar faces exhibiting high sheen. Because of the increased strength and stability of the structured instant coffee particles obtained in this process, this process is highly preferred.

The instant coffee particles obtained in this preferred novel agglomerating process also have a desirable size and a surprisingly low bulk density. The agglomeration process gives a good yield of particles which will not pass a U.S. Standard Screen No. 30. Preferably all the particles obtained pass a U.S.

Standard Screen No. 4, and most preferably all will pass a U.S. Standard Screen No. 6. Undersized and oversized particles can be separated by vibrating screens. The bulk density of the particles obtained is from about 0.20 g./cc. to about 0.40 g./cc., preferably from about 0.27 g./cc. to about 0.36 g./cc. This is the usual range for instant coffee products and is equivalent to using about one teaspoon per cup to obtain a desirable coffee brew.

Also the instant coffee particles obtained in this preferred novel agglomerating process have desirable water-solubility properties, e.g. they are fast dissolving and can be characterized as truly instant; delectable coffee can be made therefrom by simply adding water. Moreover, these instant coffee particles are more free-flowing than conventional instant coffee powders and therefore are easily measured for use by the consumer. Furthermore, these instant coffee particles are low foaming compared to conventional instant coffee powder.

The instant coffee flakes useful in this preferred process have the same characteristics as the instant coffee flakes useful in the above agglomerating process. The densified instant coffee powder must have a bulk density of from about 0.3 to about 1.0 g./cc., preferably from about 0.4 to about 0.9 g./cc., and most preferably from about 0.5 to about 0.8 g./cc. In addition, the densified instant coffee powder should be comprised of instant coffee particles having a size of from about 5 to about 500 microns, preferably a size of from about 10 to about 200 microns, and most preferably a size of from about 15 to about 100 microns.

This preferred process utilizes a mixture of instant coffee flakes and densified instant coffee powder comprised of from about 5 to about 80 percent instant coffee flakes and from about 20 to about 95 percent densified instant coffee powder. Preferably the mixture of instant coffee flakes and densified instant coffee powder contains from about 40 to about 90 percent densified instant coffee powder, and most preferably from about 60 to about 85 percent densified instant coffee powder, by weight of the mixture, the balance being flakes. Mixtures with greater than about 95 percent densified instant coffee powder do not give a sufficient yield of the desirable structured instant coffee particles which have planar faces exhibiting high sheen. Mixtures containing less than about 20 percent densified instant coffee powder do not give particles of markedly improved strength.

Densified instant coffee powder can be prepared from ordinary spray-dried instant coffee particles, freeze-dried instant coffee particles, and other suitable instant coffee particles. These instant coffee particles may be densified by passing the instant coffee particles through a roll mill, in such a manner that the particles are not compressed into instant coffee flakes, or by subjecting the instant coffee particles to other types of pulverizing equipment such as a hammer mill, or impact mill. The "Simpactor" manufactured by The Sturtevant Mill Co. is an example of a suitable hammer mill, and the Entoleter Centrifugal Machine manufactured by the Entoleter Division of Safety Industries, Inc. is an example of a suitable impact mill.

Attention is directed to the fact that the structuring process of the present invention represents a substantial departure from conventional agglomerating processes in regard to the results obtained. Whereas conventional agglomeration of small particles such as instant coffee yields larger but similar particles as the starting material, the structuring process of this invention converts flakes into novel particles of a crystalline-like, three-dimensional array.

The novel structured instant coffee particles herein are useful per se or in admixture with unstructured flakes of this invention having sheen or in admixture with conventional instant coffee particles or in admixture with both unstructured flakes having sheen and also with conventional instant coffee particles. A very preferred instant coffee composition comprises by weight from about 20 to about 85 percent structured instant coffee particles, from about 15 to about 80 percent of unstructured flakes of this invention having sheen, and from 0 to about 15 percent of loose conventional instant coffee powder.

Treating instant coffee flakes, or a mixture of instant coffee flakes and densified instant coffee powder with a jet of moistening fluid as provided herein is additionally advantageous in that the instant coffee particles so treated are darkened to a rich brown color. Other aqueous fluids other than steam and finely atomized water, for example coffee extracts, are suitable moistening fluids.

The following examples are given to illustrate several preferred embodiments of the invention disclosed herein. These examples are not intended to be a limitation upon the invention, as variations thereof will be obvious to those skilled in the art. Unless stated to the contrary all percentages mentioned herein are on a weight basis.

EXAMPLE I

This example provides a method for obtaining instant coffee flakes polished to a high sheen. Unpolished instant coffee flakes used in the process were obtained in the following manner:

Conventional instant coffee particles obtained from a spray-drying process and having a bulk density of 19 pounds per cubic foot were used as the starting material. These instant coffee particles were blended with an aromatizing coffee oil. This was accomplished by placing the instant coffee particles in a two gallon paddle mixer operating at 20 r.p.m. and then adding an aromatizing coffee oil, which had been expressed from roasted coffee beans, in an amount so that the coffee oil comprised 0.2 percent of the coffee-oil mixture. Mixing was continued for about one minute at which time a homogenous blend was formed.

Milling the instant coffee particles into flakes was accomplished by passing the coffee-oil blend one time through a roll mill having two highly polished 16-inch diameter, 24-inch wide rolls, operating at the following conditions:

| | |
|---|---|
| Front roll peripheral speed | 200 feet per minute |
| Back roll peripheral speed | 200 feet per minute |
| Temperature of rolls | 170° F. |
| Nip pressure | 1,250 pounds per inch |

Light-colored, oil-containing (0.2 percent) flakes having a thickness of about 0.003 inch to about 0.007 inch and having a density of about 1.3 g./cc. were removed from the mill. The flakes were size-reduced on a stack of vibrating screens having one-fourth inch diameter glass beads thereon. The flakes were then size-classified by sifting through a U.S. Standard Screen No. 12 on to a U.S. Standard Screen No. 30. Those flakes retained on the U.S. Standard Screen No. 30 are polished.

The instant coffee flakes are polished in the following process.

A falling stream of the instant coffee flakes in the shape of a rod having a diameter of about one thirty-second inch is formed in the following manner:

The instant coffee flakes are fed from an overhead hopper to a vibrating horizontal vibratory feeder. The vibratory horizontal feeder is electrically driven in a known manner, and has a forward edge which is seven-eighths inch in width. The flakes are spilled from the forward edge of the vibratory feeder onto a forming plate. The forming plate is a fluted sheet of material having a single V-shaped trough, and is inclined such that the the trough acts as a chute. The flakes spilled onto the forming plate by the vibratory feeder move down the trough of the plate and spill off as a discrete rod. A constant amount of instant coffee flakes is fed to the vibratory feeder such that the trough of the forming plate spills about 3 pounds of the flakes per hour.

The falling stream of instant coffee flakes is exposed to a jet of steam, the steam being at a temperature of about 212° F. The jet of steam is provided by the open end of a pipe having a diameter of three-fourths inch and connected to a source of steam. The open end of the pipe is situated approximately 3 inches below the forward edge of the vibratory feeder, approximately 3 inches from the falling stream of instant coffee flakes, and is directed, at an angle of about 90° with respect to the falling stream, to a portion of the stream which has a thickness of about one thirty-second inch. The velocity of the jet of steam is about 500 feet per minute at the point where the jet of steam is introduced to the falling stream of instant coffee flakes.

The instant coffee flakes polished by the jet of steam are collected on a vibrating inclined plane. The vibrating inclined plane is situated below and to the front of the open end of the steam pipe, and is electrically driven in known fashion. The vibrating plane disposed in this manner conveniently collects the polished instant coffee flakes, and delivers them to a moving endless belt conveyor exposed to heat lamps. The polished flakes are exposed to heat from the lamps, and heated to a temperature of about 130° F. until the flakes are dried to a moisture content of about 3.5 percent.

Instant coffee flakes are obtained in this process which have at least one external planar face polished to a high sheen. An enlarged view of a typical instant coffee flake is illustrated in the Drawing by FIG. 1. FIG. 1 shows a planar instant coffee flake 1 having a planar surface 2 polished to a high sheen.

The instant coffee flakes obtained in this process were darkened to a brown color.

EXAMPLE II

Instant coffee flakes are polished and agglomerated in the following process.

Unpolished instant coffee flakes such as those employed in Example I are formed into a falling stream of instant coffee flakes. The falling stream has the shape of a rod having a diameter of about one-half inch, and is formed in the following manner:

The instant coffee flakes are fed from an overhead hopper to a vibrating horizontal vibratory feeder. The vibrating horizontal feeder is electrically driven in a known manner, and has a forward edge which is seven-eighths inches in width. The flakes are spilled from the forward edge of the vibratory feeder onto a forming plate. The forming plate is a fluted sheet of material having a single V-shaped trough, and is inclined such that the trough acts as a chute. The flakes spilled onto the forming plate by the vibratory feeder move down the trough of the plate and spill off as a discrete rod. A constant amount of instant coffee flakes is fed to the vibratory feeder such that the trough of the forming plate spills about 60 pounds of the flakes per hour.

The falling stream of instant coffee flakes in the form of a rod having a diameter of 0.5 inch is exposed to a jet of steam, the steam being at a temperature of about 212° F. The jet of steam is provided by the open end of a pipe having a diameter of three-fourth inch and connected to a source of steam. The open end of the pipe is situated approximately 2 inches below the forward edge of the forming plate, approximately 2 inches from the falling stream of instant coffee flakes, and is directed at an angle of about 90° with respect to the falling stream. The velocity of the jet of steam is about 6500 feet per minute at the point where the jet of steam is introduced to the falling stream of instant coffee flakes. The instant coffee flakes are polished and agglomerated by the action of the jet of steam into structured instant coffee particles.

The structured instant coffee particles formed by the action of the jet of steam are collected on a smooth inclined plane. The inclined plane is situated below and to the front of the open end of the steam pipe. The particles move down the inclined plane by the force of gravity, and drop from the inclined plane onto a moving endless belt conveyor exposed to heat lamps.

Figure 2:
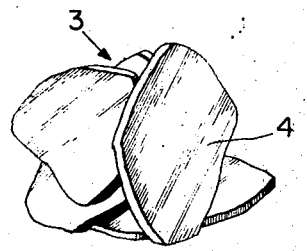
FIG. 2 and FIG. 3 illustrate structured instant coffee particles which are nonplanar, but which present a plurality of external planar faces exhibiting high sheen.

The structured particles are exposed to the heat from the lamps, and heated to a temperature of about 130° F. until the particles are dried to a moisture content of about 3.5 percent. Structured instant coffee particles are obtained in this process which are non-planar, but which have a plurality of external planar surfaces exhibiting high sheen. An enlarged view of a typical structured instant coffee particle obtained in this process is illustrated in the Drawing by FIG. 2. FIG. 2 shows a structured instant coffee particle 3 which is nonplanar, but which has a plurality of external planar faces 4 exhibiting high sheen.

The structured instant coffee particles obtained in this process were darkened to a rich brown color.

EXAMPLE III

A mixture of instant coffee particles comprised of instant coffee flakes and densified instant coffee powder was agglomerated in the following process.

Unpolished instant coffee flakes such as those employed in Example I were employed in this process. The instant coffee flakes were mixed with densified instant coffee powder such that a mixture comprised of 25 percent instant coffee flakes and 75 percent densified instant coffee powder was obtained. The densified instant coffee powder had a bulk density of 0.7 g./cc. and was comprised of particles within the size range of from 10 to 70 microns. The flakes and the powder had a moisture content of about 3.5 percent.

The mixture of instant coffee particles was fed from an overhead hopper to a vibrating horizontal vibratory feeder. The vibrating horizontal feeder is electrically driven in a known manner, and had a forward edge which is seven-eighths inches in width. The flakes were spilled from the forward edge of the vibratory feeder onto a forming plate. The forming plate was a fluted sheet of material having a V-shaped trough, and was inclined such that the trough acted as a chute. The flakes spilled onto the forming plate by the vibratory feeder moved down the trough of the plate and spilled off as a discrete rod having a diameter of about one-half inch. A constant amount of instant coffee flakes was fed to the vibratory feeder such that the trough of the forming plate spilled about 60 pounds of the instant coffee mixture per hour.

Figure 4:
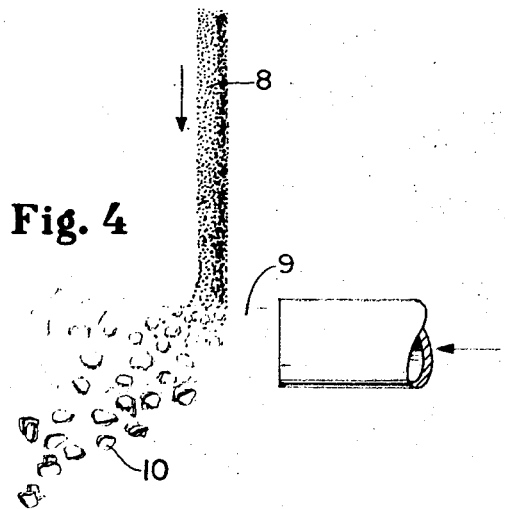
FIG. 4 is a side view of a falling stream comprised of instant coffee flakes and densified instant coffee powder (8) being introduced to a jet of steam (9).

The falling stream of instant coffee was exposed to a jet of steam, the steam being at a temperature of about 212° F. The jet of steam was provided by the open end of a pipe having a diameter of three-fourths inch and connected to a source of steam. The open end of the pipe was situated approximately 2 inches from the falling stream of instant coffee, and is directed at an angle of about 90° with respect to the falling stream. The velocity of the jet of steam was about 6,500 feet per minute at the point where the jet of steam is introduced to the falling stream of instant coffee flakes. This process is illustrated by the Drawing wherein FIG. 4 shows a stream 8 comprised of a mixture of instant coffee flakes and densified instant coffee powder being introduced to a jet of steam 9, whereupon the instant coffee flakes are polished and agglomerated into structured instant coffee particles 10.

The structured instant coffee particles formed by the action of the jet of steam were collected on a smooth inclined plane. The inclined plane was situated below and to the front of the open end of the steam pipe. The particles moved down the inclined plane onto a moving endless belt conveyor exposed to heat lamps.

The structured particles were exposed to the heat from the lamps and heated to a temperature of about 130° F. until the particles were dried to a moisture content of about 3.5 percent.

Figure 3:
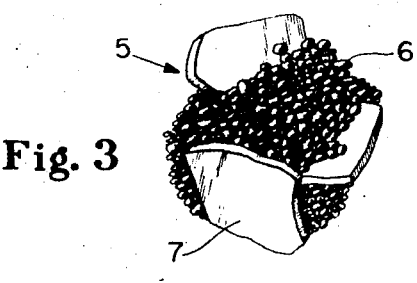

The structured instant coffee particles obtained were non-planar, but had a plurality of external planar surfaces polished to a high sheen. Magnification of the particles under a light microscope revealed fused densified coffee powder interposed among the polished planar instant coffee flakes. An enlarged view of a typical instant coffee particle obtained in this process is illustrated in the Drawing by FIG. 3. FIG. 3 shows a structured instant coffee particle 5 which is non-planar, but which has a plurality of external planar faces 7 polished to a high sheen. This structured instant coffee has good strength and stability, its strength being enhanced by fused densified instant coffee powder 6 in the particle.

The structured instant coffee particles obtained in this process were darkened to a rich dark red-brown color. This color is defined by Hunter Color values of: "L" scale, 18.3; *a* scale, +6.3; *b* scale, +6.9. A complete technical description of the Hunter Color value system can be found in an article by R. S. Hunter, "Photoelectric Color Difference Meter," Journal of the Optical Society of America, Vol. 48, pp. 985–995, 1958.

The particles were size classified to obtain particles all of which passed a U.S. Standard Screen No. 6 and all of which were retained on a U.S. Standard Screen No. 30. These structured instant coffee particles had a bulk density of 0.32 g./cc. This bulk density is the usual range for instant coffee products and is equivalent to using about one teaspoon per cup to obtain a desirable coffee brew.

The particles were fast-dissolving and delectable coffee was made from them simply by adding hot water.

The particles were more free-flowing[1] ([1]The free-flowing nature of this product was determined by a test generally referred to as the "angle of repose" test. In this test a Measurability Grade is obtained by computing the base angle of repose of a cone of instant coffee formed by pouring 30 grams of the coffee through a funnel onto a flat circular surface. The Measurability Grade thus ranges from 0° to 90° wherein the smaller the angle, the more free-flowing the product is.) than conventional instant coffee particles. This is shown by the fact that they have a Measurability Grade of 42.4° compared to a Measurability Grade of 45.5° for a conventional instant coffee powder.

The particles were low foaming compared to conventional instant coffee powders. This is shown by the fact that they have a Foam Grade[2] ([2]The foam was measured by pouring hot water (200° F.) into a cup containing 2.0 grams of instant coffee. Five seconds after addition of the water, the foam in the cup was visually observed and compared to a set of ten standard photographs showing varying degrees of foam graded on a scale of 1–10 wherein a grade of 10.0 indicates essentially no foam and a grade of 1.0 indicates a very excessive level of foam. The foam in the sample cup was then assigned the grade of the photograph to which it most nearly corresponded.) of 7.5 compared to a Foam Grade of 2.5 for a conventional instant coffee powder.

WHAT IS CLAIMED IS:

1. A process for forming especially strong structured instant coffee particles comprising
    1. forming a mixture of instant coffee particles comprising
        a. from about 5 to about 80 percent free-flowing compressed instant coffee flakes, said flakes having a thickness within the range of from about 0.002 inch to about 0.01 inch, and a density within the range of from about 0.8 g./cc. to about 1.7 g./cc., and
        b. from about 20 percent to about 95 percent densified instant coffee powder, said powder having a bulk density of from about 0.3 g./cc. to about b 1.0 g./cc., and comprised of particles having a size range of from about 5 microns to about 500 microns,
    2. forming a stream of said mixture having a thickness greater than about one-sixteenth inch,
    3. introducing to said stream, at a point where the thickness of the stream is greater than about one-sixteenth inch, a jet of moistening fluid, said jet being introduced at a velocity of from 2,000 feet/minute to 10,000 feet/minute, and at an angle of from about 45° to an angle of about 135° with respect to the direction of travel of said stream,
    4. collecting the resulting structured instant coffee product.

2. The process of claim 1 wherein the jet of moistening fluid has a velocity of from 2000 feet/minute to 8,000 feet/minute.

3. The process of claim 2 wherein the moistening fluid is steam.

4. The process of claim 3 wherein the instant coffee flakes have a thickness with the range of 0.003 inch to 0.007 inch, and have a size such that they pass a U.S. Standard Screen No. 10 and are retained on a U.S. Standard Screen No. 30.

5. The process of claim 4 wherein the densified instant coffee powder is comprised of particles having a size range of from about 10 to about 100 microns.

6. The process of claim 5 wherein the stream has the shape of a rod with a diameter of from about one-fourth inch to about 1 inch.

7. The process of claim 6 wherein the jet of steam is introduced at an angle of from about 60° to an angle of about 120° with respect to the direction of travel of the stream.

8. The process of claim 7 wherein the jet of steam is introduced at an angle of about 90°.

* * * * *